United States Patent
Chen et al.

(10) Patent No.: US 8,467,328 B2
(45) Date of Patent: Jun. 18, 2013

(54) SCHEDULING METHOD AND SCHEDULING DEVICE FOR MBMS, AND BASE STATION INCLUDING THIS SCHEDULING DEVICE

(75) Inventors: Yu Chen, Shanghai (CN); He Wang, Shanghai (CN); Pingping Xing, Shanghai (CN); Yonggang Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 884 days.

(21) Appl. No.: 12/532,287

(22) PCT Filed: Mar. 20, 2008

(86) PCT No.: PCT/CN2008/000554
§ 371 (c)(1),
(2), (4) Date: Sep. 21, 2009

(87) PCT Pub. No.: WO2008/113262
PCT Pub. Date: Sep. 25, 2008

(65) Prior Publication Data
US 2010/0113056 A1    May 6, 2010

(30) Foreign Application Priority Data
Mar. 21, 2007  (CN) .......................... 2007 1 0038486

(51) Int. Cl.
*H04W 20/70* (2009.01)
*H04W 4/00* (2009.01)

(52) U.S. Cl.
USPC ........................................ 370/312; 455/426.1

(58) Field of Classification Search
USPC ....................................................... 370/312
See application file for complete search history.

(56) References Cited

U.S. PATENT DOCUMENTS

| 8,155,648 | B2 * | 4/2012 | Lee et al. ........................ 455/434 |
| 2004/0103435 | A1 * | 5/2004 | Yi et al. .......................... 725/81 |
| 2005/0152398 | A1 | 7/2005 | Shin |
| 2006/0067281 | A1 * | 3/2006 | Kwak et al. .................... 370/337 |
| 2008/0085701 | A1 * | 4/2008 | Darwood et al. ........... 455/422.1 |
| 2009/0061914 | A1 * | 3/2009 | Cai .................................. 455/466 |
| 2009/0252093 | A1 * | 10/2009 | Frenger ......................... 370/329 |
| 2010/0234034 | A1 * | 9/2010 | Aoyama et al. ............... 455/450 |

FOREIGN PATENT DOCUMENTS

CN             180196 A        7/2006

OTHER PUBLICATIONS

International Search Report mailed May 29, 2008 for International application No. PCT/CN2008/000554.
EP Search Report, Jan. 6, 2012.
3GPP TSG RAN WG3 Meeting #54, Riga, Lativia, Nov. 6-10, 2006.
3GPP TSG-RAN WG2 #57, St. Louis, USA Feb. 15-19, 2007.
3GPP TS 25.331, Dec. 2006; particularly section 8.7.1.1, pp. 376-377; section 8.7.4.2, p. 384, and section 10.2.16j, section 425-427.

(Continued)

*Primary Examiner* — Brandon Renner
*Assistant Examiner* — Shaq Taha
(74) *Attorney, Agent, or Firm* — Fay Sharpe LLP

(57) ABSTRACT

A scheduling method for multimedia broadcast/multicast service (MBMS) is provided according to the present invention, comprising steps of: configuring service specific information and service scheduling information separately from MBMS service data to form an MCCH control message of an MBMS control channel; and transmitting the MCCH control message and the MBMS service data to a receiving end, wherein the service specific information and the service scheduling information are applied with a single-frequency network combining scheme.

21 Claims, 2 Drawing Sheets

OTHER PUBLICATIONS

3GPP TS 25.346, Dec. 2005, $3^{rd}$ Generation Partnership Project; Technical Specification Group Radio Access Network; Introduction of the Multimedia Broadcast Multicast Service (MBMS) in the Radio Access Network (RAN); Stage 2 (Release 6); pp. 1-60, particularly Annex B.

* cited by examiner

SCHEDULING METHOD AND SCHEDULING DEVICE FOR MBMS, AND BASE STATION INCLUDING THIS SCHEDULING DEVICE

BACKGROUND OF THE INVENTION

1. Field of Invention

The present invention relates to mobile communication, and particularly to a scheduling method and a scheduling device for Multimedia Broadcast/Multicast Service (MBMS), and a base station including this scheduling device. In this manner, single frequency network (SFN) combining schemes are used for the service specific information and the service scheduling information, and MBMS control channels (MCCH) are formed and multiplexed with data channels. Therefore, the system is improved in robustness.

2. Description of Prior Art

3GPP (the Third Generation Partner Project) initiated a long-term evolvement (LTE) research project in 2005 to provide support for operators' and user's increasing demands with higher data throughput and better network performance.

Multimedia Broadcast/Multicast Service (MBMS) is a service introduced by 3GPP Rel6, which refers to a point-to-multipoint service through which a data source transmits data to multiple users. This service can thus achieve resource sharing of a network (including a core network and an access network) so as to serve as many multimedia users having the same demands as possible by using least resources. In a radio access network, MBMS service can provide both message-oriented multicast and broadcast including plain text with a low rate, and multicast and broadcast of multimedia service with a higher rate, e. g., mobile phone TV, by using a common transmission channel and a common radio bearer.

Currently, EMBMS (Evolved MBMS) is under various researches.

In prior art, the foremost control information, i.e., general information for the MBMS, can not be combined. This results in extremely poor robustness. Actually, some information, such as service specific information and service scheduling information, can be applied with a single-frequency network (SFN) combining scheme. This is, however, not reflected in the prior art, which leads to a low efficiency. Moreover, multiplexing of control channels and data channels is not provided in the prior art. It is to be noted that the multiplexing of the control channels and the data channels can reduce management complexity of the SFN area so that the data channels and the control channels can share the same resource allocation scheme and multi-cell coordination scheme.

SUMMARY OF THE INVENTION

The present invention is proposed to overcome the above problems. Therefore, it is an object of the present invention to provide a scheduling method and a scheduling device for multimedia broadcast/multicast service (MBMS), and a base station including this scheduling device.

In this manner, the service specific information and the service scheduling information are applied with a single-frequency network combining scheme, and MBMS control channels (MCCH) are formed and multiplexed with data channels. Therefore, the system robustness is improved.

To achieve the above object, according to the present invention, a scheduling method for multimedia broadcast/multicast service MBMS is provided, comprising steps of: configuring service specific information and service scheduling information separately from MBMS service data to form an MCCH control message of an MBMS control channel; and transmitting the MCCH control message and the MBMS service data to a receiving end, wherein the service specific information and the service scheduling information are applied with a single-frequency network combining scheme.

Preferably, the SFN combining scheme comprises SFN level combination, SFN area level combination and SFN area intersection level combination.

Preferably, the MCCH control message further comprises general information which can be combined in SFN level.

Preferably, the general information comprises radio bearer RB configuration information, frequency information, timer information and trigger information.

Preferably, the MCCH control message further comprises SFN area IDs which are SFN area intersection level combinable.

Preferably, the MCCH control message further comprises cell specific information which includes a service list.

Preferably, the service list is SFN area intersection level combinable.

Preferably, the MCCH control message further comprises counting information which is cell level combinable for counting in on/off manner.

Preferably, the service specific information and the service scheduling information which are applied with SFN area intersection level combination are added before all of the MBMS service data in a scheduling period.

Preferably, the service specific information and the service scheduling information which are applied with SFN area level combination is added respectively before each of the MBMS service data in a scheduling period.

Preferably, the MCCH control message is not based on reservation.

According to the present invention, a scheduling device for multimedia broadcast/multicast service MBMS is also provided, comprising: MCCH control message forming means for configuring service specific information and service scheduling information separately from MBMS service data to form an MCCH control message of an MBMS control channel; and transmission means for transmitting the MCCH control message and the MBMS service data to a receiving end, wherein the service specific information and the service scheduling information are applied with a single-frequency network combining scheme.

Furthermore, according to the present invention, a base station comprising the above scheduling device is also provided.

According to the present invention, the control channel can be provided in SFN to the maximum extent so that capacity and reliability of the control channel are improved.

The mobile station (UE) can reduce the time for reading the control channel so that battery life is prolonged.

BRIEF DESCRIPTION OF THE DRAWINGS

The above objects, advantages and features of the present invention will become apparent from a detailed description of preferred embodiments, taken below in conjunction with the accompanying figures, wherein.

DETAILED DESCRIPTION OF PREFERRED EMBODIMENTS

Figure 1:
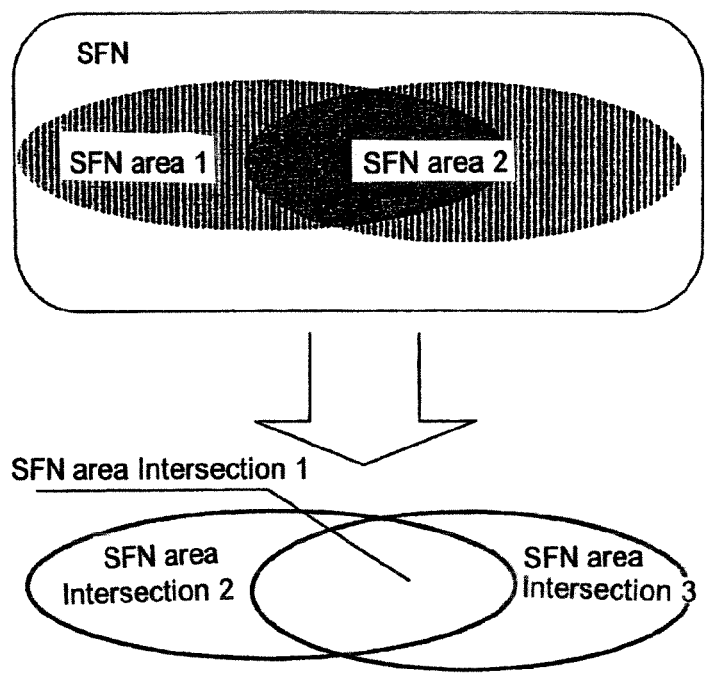
FIG. 1 is a schematic diagram illustrating SFN area intersection level combination in the case that SFN areas intersect with each other.

In order to design MBMS control channel (MCCH) structure of the present invention, the following principles are considered:

1. performance at the edge of a cell;
2. the required bandwidth; and
3. battery saving for UE.

SFN operation or repetition (as used in 3GPP specification Release 6) is a method for effectively ensuring the performance at the edge of a cell for a signaling message. However, this repetition (i. e., low coding rate) requires more bandwidth. According to the contents on MBMS in the Release 6, 64 parallel MBMS services may exist simultaneously. Therefore, bit rate required for signaling transmission can exceed 100 kbps. Consequently, the method according to the present invention can result in higher transmission efficiency, i. e., larger channel capacity.

On the other hand, the system capacity generated by using the SFN operation will become much larger than that without the SFN operation. This would thus further reduce the bandwidth requirement. In the single frequency network, UE simultaneously receives the same wireless channels transmitted from all of base stations and performs RF combination, which is the so-called SFN operation. The SFN operation generates gain from multiple-cell combination, allowing the system capacity to be significantly increased. Larger system capacity means that the same amount of data can be transmitted by using less bandwidth resource.

Furthermore, battery life is an important issue occurring in the MBMS service. To save the battery life, the UE should be capable of readily know whether its concerned service exists. This is provided periodically. Preferably, the signaling should be transmitted only during very short time slot, and in most times, the UE disconnects the receiver. From this point, the repetition method leads to longer repletion time. The system capacity is significantly increased due to use of the SFN operation for MBMS signaling transmission so that the time for transmitting the same amount of data is greatly reduced and the time for UE to read this information is thereby reduced. Therefore, the battery life is prolonged.

Therefore, the SFN operation should be used for the signaling message as widely as possible.

Firstly, the composition of an MBMS control channel (MCCH) control message will be discussed. According to the present invention, the MCCH control message comprises the following six categories of information:

General information, e. g. radio bearer (RB) configuration information, frequency information, timer information, trigger information, etc.

Service specific information including notification/RB release, etc. The notification information mainly notifies a user that his concerned service has started or configurations have been changed (including end of the service, RB release, etc.).

SFN area IDs (identifications). When the SFN operation is performed, the information is transmitted in unit of the SFN area. Each SFN area employs the same configuration and can be easily indexed through IDs.

Service scheduling information for indicating which services have been allocated with resources and which resources have been allocated during a scheduling period.

Cell specific information including some information only transmitted in the present cell, e.g., the information for single-cell services, and also including a service list, etc.

Counting information for representing statistics for the number of the UE that currently receive this service.

Among various information mentioned above, general information is significant for all of the MBMS multi-cell transmission, which includes the basic radio parameters, such as default RB configuration information, timer information, and trigger information. This general information is common to all the cells in the SFN. Thus, the general information could be SFN area wide combinable. It should be noted, such general information would be a considerable part of the MCCH control message.

In general, the cell specific information can not be combined. But it should be noted, for counting in on/off manner, the counting information is cell common and thus cell level combinable.

Then, we will describe how to apply SFN combining schemes to the service specific information and the service scheduling information with reference to the figures.

Here, the SFN combining schemes includes SFN level combination, SFN area level combination and SFN area intersection level combination. The SFN level combination can be applied to any cells which support the SFN operation. The SFN area level combination means that only signals transmitted from the cells in the SFN area can be combined. The SFN area intersection level combination means that different SFN areas cover different areas, but those cells within the overlapping portions of the SFN areas have the same service data and the same control signaling, as a result of which, the signals transmitted from those cells are combinable.

FIG. 1 is a schematic diagram illustrating SFN area intersection level combination in the case that SFN areas intersect with each other.

Two or more SFN areas may overlap with each other, as shown in FIG. 1. Every cell may belong to different SFN areas, but there may be some intersection part. Those cells in the SFN area intersection part in FIG. 1 have the same information to be broadcasted for the service specific information and the service scheduling information. In such a case, the service specific information and the service scheduling information can be combined in SFN area intersection level. It should be noted that the SFN area intersection level combination is transparent to UE.

Figure 2:
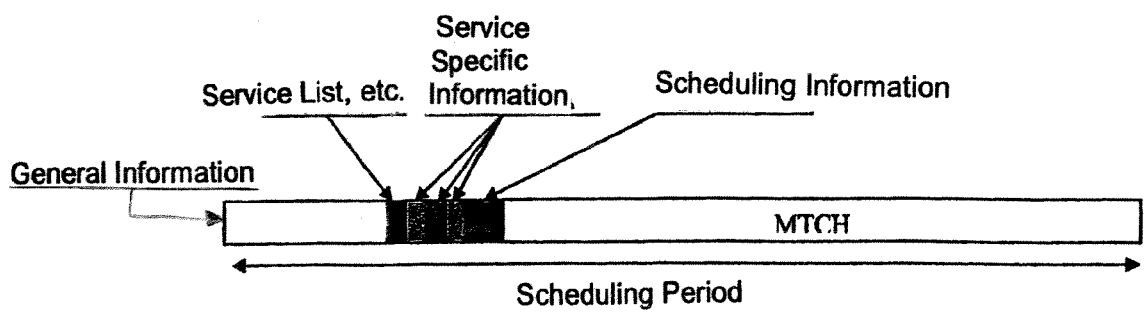
FIG. 2 is a schematic diagram illustrating SFN area intersection level combination of the service specific information and the service scheduling information in an MCCH control message according to the present invention.

FIG. 2 is a schematic diagram illustrating the SFN area intersection level combination of the service specific information and the service scheduling information in an MCCH control message according to the present invention.

The service specific information and the service scheduling information in the MCCH control message are configured separately from the MBMS service data, as shown in FIG. 2. Here, the service specific information and the service scheduling information are applied with the SFN area intersection level combination.

The structure shown in FIG. 2 makes signaling notification easy. The UE may have enough time to establish radio bearer (RB), because the service specific information and the service scheduling information can have sufficient time to be transmitted before the data transmission. The MTCH (MBMS transmission channel) in FIG. 2 is configured for transmitting the MBMS service data.

It should be noted that the structure of the MCCH control message in FIG. 2 is based on a non-reservation structure.

According to the present invention, MBMS data is transmitted based on the SFN area intersection level combination of the service specific information and the service scheduling information in the MCCH control message, as shown in FIG. 2. Therefore, during the scheduling period, the service specific information and the service scheduling information are added the time domain before all of the MBMS service data to form the MCCH control message of the present invention. The specific control channel structure is shown in FIG. 2.

For the scenario shown in FIG. 1, if most of the SFN areas are identical, the gain from the SFN area intersection level combination as shown in FIG. 2 is similar to the SFN area level combination. In the scenario shown in FIG. 2, the service lists (the cell specific information) can also be combined in SFN area intersection level. Since the services of different SFN intersection parts are identical, the service lists are bound to be the same and thus can be combined.

Figure 3:
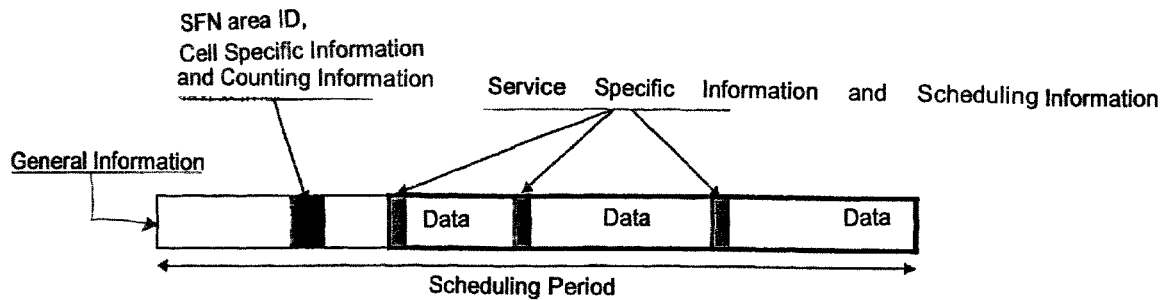
FIG. 3 is a schematic diagram illustrating SFN area level combination of the service specific information and the service scheduling information in the MCCH control message according to the present invention.

FIG. 3 is a schematic diagram illustrating the SFN area level combination of the service specific information and the service scheduling information in the MCCH control message according to the present invention.

For all the cells in the same SFN area, The service specific information and the service scheduling information in the MCCH control message are identical. In such case, the service specific information and the service scheduling information can be combined in SFN area level.

As shown in FIG. 3, during the scheduling period, the corresponding service specific information and service scheduling information can be added respectively before each of the MBMS service data, after the corresponding service specific information and service scheduling information are combined in SFN area level.

It should be noted that the service specific information and the service scheduling information can be transmitted on separate transmission blocks (TB), so that they may have different QoS. For a plurality of adjacent TBs on which the same MBMS service data is transmitted, the service specific information and the service scheduling information are only added in the first TB.

Such MCCH control message structure may have some drawback for signaling notification. However, the service specific information and the service scheduling information utilizes only a small amount of radio resources, so the MCCH and the MTCH (MBMS transmission channel) may be frequency division multiplexed (FDM).

The states of the MCCH control message applied with SFN combining schemes according to the present invention have been shown above only as examples. The present invention is not intended to be limited to this.

To sum up, with respect to the information in the MCCH control message, other than the service specific information and the service scheduling information:

the general information is SFN area level combinable;
the SFN area ID list can be combined in SFN area intersection level;
the cell specific information for single-cell service generally can not be combined, but the cell specific information for multi-cell services (e. g., the service list) is SFN area intersection level combinable; and
the counting information is generally cell-specific. For counting in on/off manner, cell common counting is possible. In such case, it can be combined in cell level.

As described above, according to the present invention, different types of information in the MCCH control message can be combined in different (optimized) level.

Figure 4:
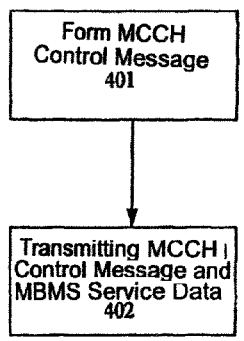
FIG. 4 is a flow diagram illustrating a scheduling method for MBMS service according to the present invention.

FIG. 4 is a flow diagram illustrating a scheduling method for MBMS service according to the present invention.

As shown in FIG. 4, at Step 401, the service specific information and the service scheduling information are configured separately from the MBMS service data to form control message of MBMS control channel (MCCH). At Step 402, the MCCH control message and the MBMS service data are then transmitted to a receiving end. Here, the service specific information and the service scheduling information are applied with a single-frequency network (SFN) combining scheme. The SFN combining scheme includes SFN level combination, SFN area level combination and SFN area intersection level combination. The specific application of the combination schemes is described above.

Figure 5:
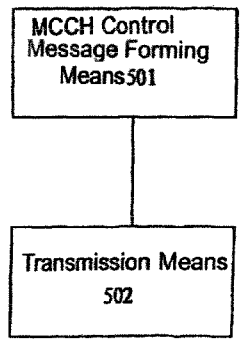
FIG. 5 is a block diagram illustrating a scheduling device for MBMS service according to the present invention.

FIG. 5 is a block diagram illustrating a scheduling device for MBMS service according to the present invention. As shown in FIG. 5, the scheduling device according to the present invention comprises MCCH (MBMS control channel) control message forming means 501 and transmission means 502. The MCCH control message forming means 501 configures the service specific information and the service scheduling information separately from the MBMS service data to form the MCCH control message. The transmission means 502 transmits the MCCH control message and the MBMS service data to a receiving end. The service specific information and the service scheduling information are applied in a single-frequency network combining scheme (SFN), as described above.

Here, the scheduling device can be included in a transmitting end of a mobile communication system. This transmitting end is typically a base station, and the receiving end described above is typically a mobile station.

According to the present invention, the control channel can be provided in SFN to the maximum extent so that capacity and reliability of the control channel are improved. The mobile station (UE) can reduce the time for reading the control channel so that the battery life is prolonged.

Although the present invention has been shown in connection with the preferred embodiments thereof, those skilled in the art will appreciate that various modifications, substitutions and alternations can be made without departing the spirit and scope of the present invention. Therefore, the present invention should not be defined by the above embodiments but by the appended claims and equivalents thereof.

What is claimed is:

1. A scheduling method for multimedia broadcast/multicast service (MBMS), comprising:
    configuring service specific information and service scheduling information separately from MBMS service data to form an MBMS control channel (MCCH) control message of an MBMS control channel; and
    transmitting the MCCH control message and the MBMS service data to a receiving end,
    wherein the service specific information and the service scheduling information are applied with a single-frequency network (SFN) combining scheme and wherein the SFN combining scheme comprises SFN level combination, SFN area level combination and SFN area intersection level combination.

2. The method according to claim 1, wherein the MCCH control message further comprises general information which is SFN level combinable.

3. The method according to claim 2, wherein the general information comprises radio bearer RB configuration information, frequency information, timer information and trigger information.

4. The method according to claim 1, wherein the MCCH control message further comprises SFN area IDs which are SFN area intersection level combinable.

5. The method according to claim 1, wherein the MCCH control message further comprises cell specific information which includes a service list.

6. The method according to claim 5, wherein the service list is SFN area intersection level combinable.

7. The method according to claim 1, wherein the MCCH control message further comprises counting information which is cell level combinable for counting in on/off manner.

8. The method according to claim 1, wherein the service specific information and the service scheduling information which are applied with SFN area intersection level combination is added before all of the MBMS service data in a scheduling period.

9. The method according to claim 1, wherein the service specific information and the service scheduling information which are applied with SFN area level combination is added respectively before each of the MBMS service data in a scheduling period.

10. The method according to claim 1, wherein the MCCH control message is not based on reservation.

11. A scheduling device for multimedia broadcast/multicast service (MBMS), comprising:
an MBMS control channel (MCCH) control message processor for configuring service specific information and service scheduling information separately from MBMS service data to form an MCCH control message of an MBMS control channel; and
a transmitter for transmitting the MCCH control message and the MBMS service data to a receiving end,
wherein the service specific information and the service scheduling information are applied with a single-frequency network (SFN) combining scheme and wherein the SFN combining scheme comprises SFN level combination, SFN area level combination and SFN area intersection level combination.

12. The device according to claim 11, wherein the MCCH control message further comprises general information which is SFN level combinable.

13. The device according to claim 12, wherein the general information comprises radio bearer RB configuration information, frequency information, timer information and trigger information.

14. The device according to claim 11, wherein the MCCH control message further comprises SFN area IDs which are SFN area intersection level combinable.

15. The device according to claim 11, wherein the MCCH control message further comprises cell specific information which includes a service list.

16. The device according to claim 15, wherein the service list is SFN area intersection level combinable.

17. The device according to claim 11, wherein the MCCH control message further comprises counting information which is cell level combinable for counting in on/off manner.

18. The device according to claim 11, wherein the scheduling device adds the service specific information and the service scheduling information which are applied with SFN area level combination are added before all of the MBMS service data in a scheduling period.

19. The device according to claim 11, wherein the scheduling device adds the service specific information and the service scheduling information which are applied with SFN area level combination is added respectively before each of the MBMS service data in a scheduling period.

20. The device according to claim 11, wherein the MCCH control message is not based on reservation.

21. The device according to claim 11, implemented in a base station.

* * * * *